(12) United States Patent
Steinmeyer

(10) Patent No.: US 7,355,307 B2
(45) Date of Patent: Apr. 8, 2008

(54) ROTARY TRANSFORMER FOR SUPPLYING ELECTRIC POWER TO A SUPERCONDUCTING ROTOR

(75) Inventor: Florian Steinmeyer, Herzogenaurach (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 11/423,186

(22) Filed: Jun. 9, 2006

(65) Prior Publication Data

US 2007/0070559 A1    Mar. 29, 2007

Related U.S. Application Data

(63) Continuation of application No. 10/846,361, filed on May 14, 2004, which is a continuation of application No. PCT/DE02/04071, filed on Oct. 31, 2002.

(30) Foreign Application Priority Data

Nov. 15, 2001 (DE) ................ 101 56 212

(51) Int. Cl.
   *H02K 55/04* (2006.01)
(52) U.S. Cl. .............. 310/52; 505/166; 336/120
(58) Field of Classification Search .............. 310/52, 310/262, 232; 505/166; 336/120
   See application file for complete search history.

(56) References Cited

U.S. PATENT DOCUMENTS 2,448,028 A * 8/1948 Gross .................. 336/170
3,273,046 A * 9/1966 Bedford .................. 363/138
3,934,332 A * 1/1976 Trunzo .................. 267/225
4,598,241 A   7/1986 Sereda .................. 318/439
5,442,956 A   8/1995 Persson .................. 73/118.1
5,482,919 A   1/1996 Joshi .................. 310/52
5,532,532 A   7/1996 DeVault et al. .............. 310/52
5,572,178 A  11/1996 Becker et al. .............. 336/120
5,965,959 A  10/1999 Gamble et al. ............. 307/125
6,362,588 B1  3/2002 Umans et al. .............. 318/521
6,420,842 B1  7/2002 Gold .................. 318/141

FOREIGN PATENT DOCUMENTS

| DE | 14 88 730 A | 7/1969 |
| DE | 30 27 340 A | 2/1982 |
| DE | 40 19 241 C2 | 12/1991 |
| EP | 0 860 936 A2 | 8/1998 |
| GB | 1 098 602 | 1/1968 |
| JP | 63310366 A | 12/1988 |
| WO | WO 01/58005 A | 8/2001 |

* cited by examiner

*Primary Examiner*—Karl Tamai
*Assistant Examiner*—David W. Scheuermann
(74) *Attorney, Agent, or Firm*—Henry M. Feiereisen; Ursula B. Day

(57) ABSTRACT

A device for supplying electric energy to at least one superconductor, with the superconductor being cooled in a cooled region to at least one predetermined temperature for achieving superconductivity, includes at least one electric energy source, and a transformer for transferring electric energy between the at least one energy source and the superconductor. The transformer has a primary winding electrically connected with the energy source and a secondary winding electrically connected with the superconductor, wherein at least the secondary winding of the transformer is arranged within the cooled region.

18 Claims, 8 Drawing Sheets

ROTARY TRANSFORMER FOR SUPPLYING ELECTRIC POWER TO A SUPERCONDUCTING ROTOR

CROSS-REFERENCES TO RELATED APPLICATIONS

This application is a continuation of prior filed copending U.S. application Ser. No. 10/846,361, filed May 14, 2004, which is a continuation of prior filed copending PCT International application no. PCT/DE02/04071, filed Oct. 31, 2002, which designated the United States and on which priority is claimed under 35 U.S.C. §120, and which claims the priority of German Patent Application, Serial No. 101 56 212.8, filed Nov. 15, 2001, pursuant to 35 U.S.C. 119(a)-(d), the contents of which are incorporated herein by reference.

BACKGROUND OF THE INVENTION

The present invention relates to a device for supplying electric power to a superconductor, in particular to a superconducting winding, which can be cooled to a predetermined temperature for achieving superconductivity.

A superconducting rotor with a superconducting winding for an electric motor is known, for example, from U.S. Pat. No. 5,482,919 A. The superconducting winding is cooled by a cooling system to a sufficiently low temperature, so that the coil becomes superconducting. Preferably, a high-temperature superconducting material (HTSC) is used with a superconducting transition temperature above approximately 35 K. The coil can be cooled by a cooling system that employs the Gifford-McMahon cycle or the Stirling cycle process for cooling.

An AC current is supplied to the superconducting coil via brush rings. However, the brushes can wear down which adversely affects the life expectancy of the motor, and the brush rings can introduce excessive heat into the cooled region. For example, when the current is supplied through a current supply line that is cooled only by thermal conduction, approximately 45 W/kA are introduced into the cooled region at a temperature of between 20 K and 40 K. At least 27 W of thermal energy are introduced by the two required current supply lines at a typical operating current in the superconductor of, for example, 300 A. This approximately equals the total cooling power of a conventional high-efficiency Gifford-McMahon cooler (approximately 25 W at 20 K). The operating temperature of the coil increases with the heat loss introduced by the current supply lines. This reduces the critical current of the superconductor and hence also the magnetic field strength attained by the coil. This limits the current that can be efficiently supplied to the motor and makes the operation of the motor less cost-effective.

It would therefore be desirable to provide a device for supplying electric power to a superconductor, in particular to a superconducting winding of a motor, to obviate prior art shortcomings and to operate efficiently and economically. It would also be desirable to minimize heat transfer via the current supply lines, so that the superconductive properties of the superconductor and hence the magnetic field strength of the superconducting winding or coil can be maintained.

SUMMARY OF THE INVENTION

The device described herein is designed to supply power to a superconductor, in particular a superconducting winding of an electric motor with a superconducting rotor. At least one transformer is used to transmit energy between a source of electric energy and the superconductor. The transformer transmits the electric energy to the superconductor without the use of brushes that can wear out. The transformer(s) can also significantly reduce heat transfer into the cooled superconductor.

According to one aspect of the invention, a device for supplying electric energy to at least one superconductor, wherein the superconductor is cooled in a cooled region to at least one predetermined temperature for achieving superconductivity, includes at least one electric energy source and a transformer for transferring electric energy between the at least one energy source and the superconductor. The transformer has a primary winding electrically connected with the energy source and a secondary winding electrically connected with the superconductor. At least the secondary winding of the transformer is arranged within the cooled region.

According to another aspect of the invention, a device for supplying electric energy to at least one superconductor, wherein the superconductor is cooled in a cooled region to at least one predetermined temperature for achieving superconductivity, includes at least one electric energy source and a first transformer and a second transformer. Each transformer has a primary winding and a secondary winding for transferring electric energy between the energy source and the superconductor. The primary winding of the first transformer is electrically connected with the energy source and the secondary winding of the second transformer is electrically connected with the superconductor. At least the primary winding of the first transformer is arranged outside the cooled region.

Advantageously, the transformer or transformers transform an AC voltage applied to the primary winding into an AC voltage in the secondary winding. The magnitude of the AC voltage in the secondary winding of the transformer or the second transformer can be smaller or greater than, or equal to, the magnitude of the AC voltage in the primary winding of the transformer. When using two transformers, an AC voltage applied to the primary winding of the second transformer, which is connected with the secondary winding of the first transformer, is transformed into an AC voltage of the secondary winding of the second transformer that is provided to the superconductor.

In one advantageous embodiment, the secondary winding of the transformer can rotate relative to the primary winding and particularly together with the superconductor. The primary winding and the secondary winding of the transformer and also of the second transformer can be spaced apart by an air gap, or alternatively by a layer of an electrically insulating material arranged between the primary winding and the secondary winding.

According to another advantageous embodiment, the primary winding of the transformer can be arranged outside the cooled region. When two transformers are used, the primary and/or secondary winding of the first transformer and/or of the second transformer can also be arranged outside the cooled region. Alternatively or in addition, the primary winding and/or the secondary winding of the second transformer can also be arranged inside the cooled region.

Advantageously, the superconductor can rotate with respect to the motor stator. Moreover, the secondary winding of one of the first and second transformers can also rotate relative to the primary winding of that first or second transformer and also together with the superconductor.

According to yet another advantageous embodiment, at least one rectifier or MOSFET can be electrically connected before the superconductor. The rectifier or MOSFET can be telemetrically controlled. Advantageously, the transformer can be operated at high frequencies to increase its efficiency. The primary winding and the secondary winding of the transformer and/or of the second transformer can be arranged axially side-by-side or radially stacked on top of one another.

According to another advantageous embodiment, the primary winding and the secondary winding of the transformer can be arranged at, on, or in a common magnetic flux-conducting body. Alternatively, the primary winding of the transformer can be arranged at, on, or in a first magnetic flux-conducting body, and the secondary winding of the transformer can be arranged at, on, or in a second separate magnetic flux-conducting body. When two transformers are employed, the primary winding and the secondary winding of at least one of the first and second transformers can be arranged at, on, or in a common magnetic flux-conducting body. Or the primary winding and the secondary winding of the first transformer can be arranged at, on, or in a first magnetic flux-conducting body, and the primary winding and the secondary winding of the second transformer can be arranged at, on, or in a second magnetic flux-conducting body.

According to another aspect of the invention, a superconductor constructed in the manner described above can rotate and hence form a superconducting rotor coil in an electric motor. In this case, the primary winding of the transformer can be stationary relative to the superconductor, while the secondary winding of the transformer can rotate together with the superconducting rotor coil.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
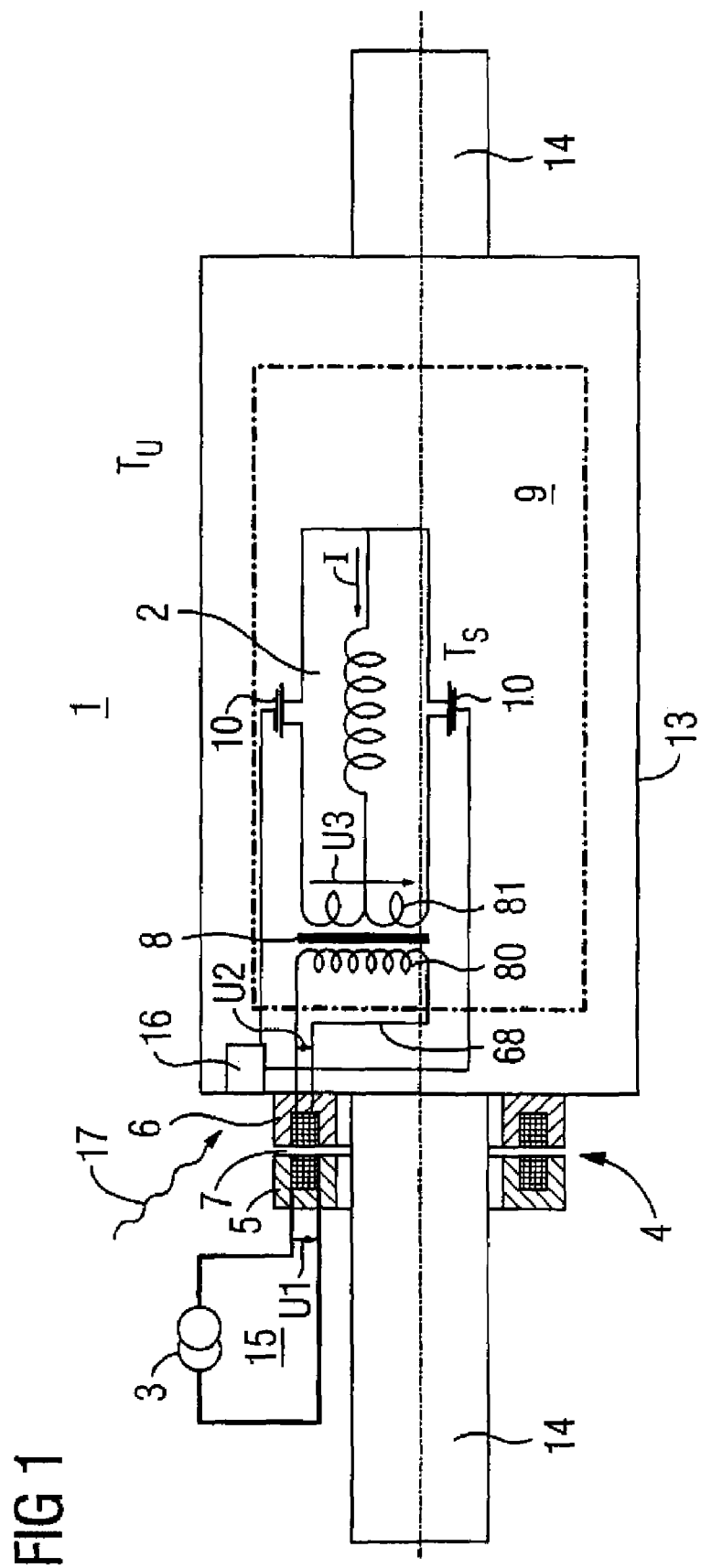
FIG. 1 shows a cross-section of a first embodiment of a synchronous motor with a superconducting rotor coil with two transformers.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an electric motor 1 with a superconducting rotor coil (winding) 2. The rotor coil 2 must be cooled to enable superconductivity in the coil 2. For this purpose, the electric motor 1 includes a cooled region 9 which is indicated in FIG. 1 by dash-dotted lines and is located inside a cryogenic vessel 13. The region 9 is cooled by a cooling system that operates according to the Gifford-McMahon cycle or the Stirling cycle. The rotor coil 2 is preferably made of a high-temperature superconducting material (HTSC) having superconducting transition temperature above 35 K.

Power to the rotor coil 2 is supplied by an electric energy source 3, which can be a stationary power supply 15. A first transformer 4 is provided for transmitting the electric energy to the rotor coil 2. The first transformer 4 has a primary winding 5 axially spaced by an air gap 7 from a secondary winding 6. While the primary winding 5 is stationary, the secondary winding 6 is connected with the schematically indicated rotor 16 for rotation therewith. The shaft 14 of rotor 16 is supported in bearings (not shown).

The primary winding 5 of the transformer 4 is electrically connected with the energy source 3. The energy source 3 produces an AC voltage U1, i.e., a temporally changing voltage of alternating polarity, which is applied to the primary winding 5 of the transformer 4. The AC voltage U1 is electrically coupled via the air gap 7 to the secondary winding 6 of the transformer 4 and transformed. The transformed output voltage of the secondary winding, referred to as U2, is also an AC voltage. While the frequency of the AC voltage U2 is generally the same as a frequency of the original AC voltage U1, the ratio U2/U1 of the two AC voltages U2 and U1, also referred to as transformer ratio or voltage transformation ratio, can be set by selecting number of turns in the primary winding 5 and/or the secondary winding 6.

As seen from FIG. 1, the two windings 5 and 6 of the first transformer 4 are located outside the cooled region 9, i.e. essentially at ambient temperature $T_u$.

A second transformer 8 is connected downstream of the first transformer 4 and, in particular, to the secondary winding 6 of the first transformer 4. The second transformer 8 is connected to and supplies electric energy to the rotor coil 2. The second transformer 8 is located in the cooled region 9 having a temperature $T_s$ that supports superconductivity of the rotor coil 2. The primary winding 80 of the second transformer 8 is electrically connected with the secondary winding 6 of the first transformer 4 via a high-current wire (current supply line) 68. The center tap of the secondary winding 81 of the transformer 8, on the other hand, is electrically connected with the rotor coil 2, as shown in FIG. 1. The supply voltage generated at the secondary coil 81 of the second transformer 8 is also an AC voltage and shown as U3.

In order to reduce the heat flow from the secondary winding 6 of the transformer 4, that is located in the warm region, into the cooled region 9 through the high-current wire (current supply line) 68, the AC voltage U1 supplied by power supply 15 is stepped up by the transformer 4 to a significantly higher voltage U2. The transformation ratio can be at least 2, in particular at least 5, or can be greater than 10. As a result of the higher voltage U2, the current in the current line 68 is reduced while delivering the same electric power. Accordingly, the cross-section of the current line 68 can be significantly reduced without increasing the heat dissipation, which would otherwise result from the increased power supply line resistance.

Both transformers 4 and 8 operate at high frequencies. The operating frequencies are typically in a range between 100 Hz and 1 MHz, but can also be smaller or greater.

Each of the transformers 4 and 8 has a transformation ratio which can be selected over a wide range.

The energy from the electric energy source 3 is preferably supplied into the "cold region", i.e., from the first transformer 4 to the second transformer 8, at a higher voltage U2 and a smaller current via the electric connection, i.e. the current supply line 68.

The electric energy is transformed in the second transformer 8 to a smaller voltage U3 and a correspondingly higher current. Accordingly, the second transformer 8 can be used to bring the current in the circuit of the superconductor 2 to the required level by stepping down the voltage U2 to the smaller voltage U3. Only small thermal losses are observed in the cooled region 9 which is at cryogenic temperatures.

The current for operating the superconducting coil 2 is subsequently rectified in a rectifier—depicted in FIG. 1 in form of a circuit with two MOSFET switches. To operate the rectifier 10, the MOSFET gates have to be controlled by a voltage with the proper phase, which is achieved by using a controller 16 that rotates together with the rotor.

The controller 16 is controlled in a non-contacting manner by schematically indicated telemetry 17. This can be accomplished, for example, by infrared transmission, via a fiber-optic brush ring, or by radio waves. The telemetry 17 is typically required anyway for monitoring the operating temperature and voltage of the rotor coil 2. If necessary, the transformer 4 can also supply the energy for powering the controller 16 or the telemetry 17.

FIGS. 2, 3, 4, 6 and 7 show alternative embodiments of the electric motor 1. For example, while the primary winding 5 and the secondary winding 6 of the transformer in FIG. 1 are arranged side-by-side in the axial direction of shaft 14, the two windings 5, 6 are stacked radially in the embodiment shown in FIG. 2. The air gap 7 is here shaped as a hollow cylinder. Otherwise, the configuration of the electric motor 1 is substantially identical to that of FIG. 1.

Figure 2:
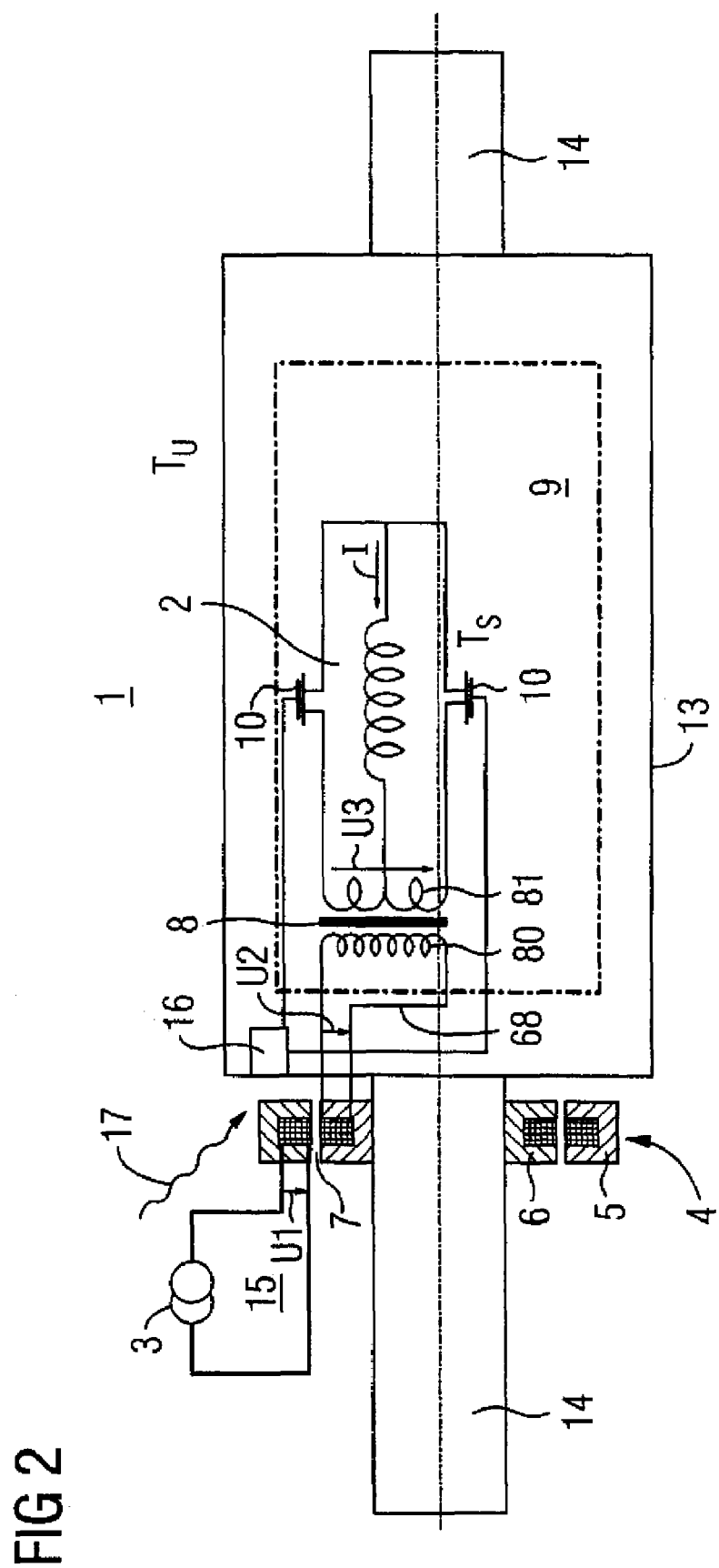
FIG. 2 shows a cross-section of a second embodiment of a synchronous motor with a superconducting rotor coil with two transformers.
Figure 3:
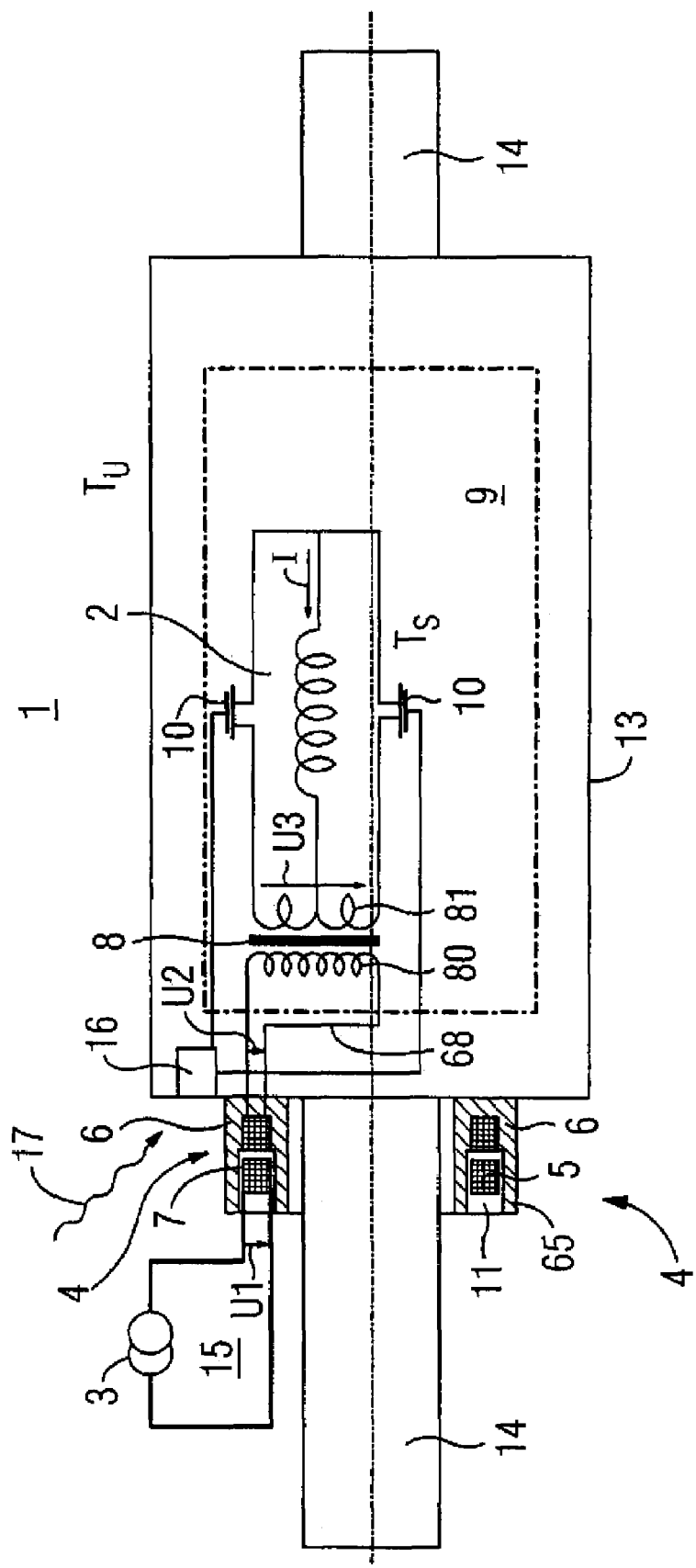
FIG. 3 shows a cross-section of a third embodiment of a synchronous motor with a superconducting rotor coil with two transformers.
Figure 7:
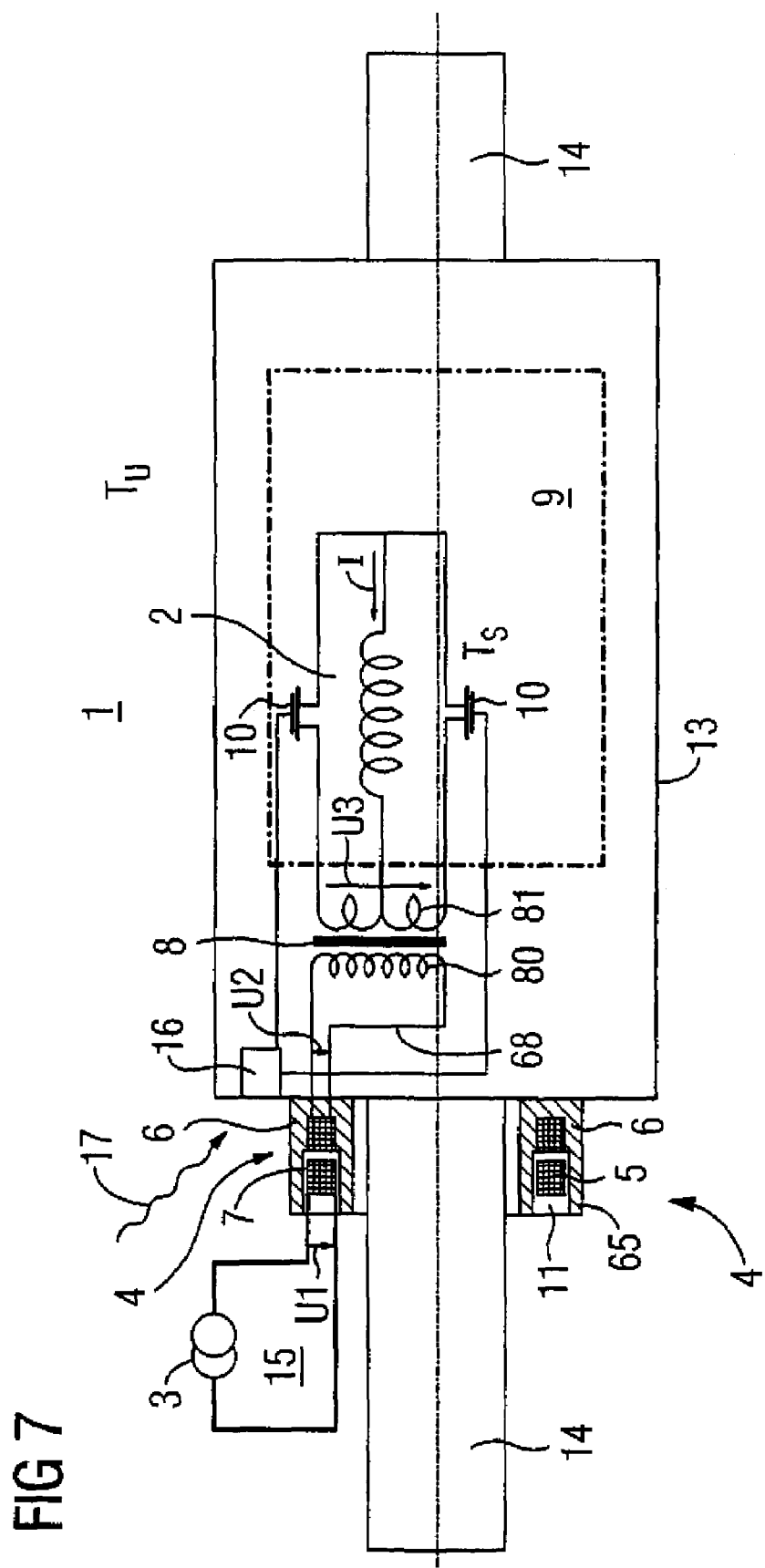
FIG. 7 shows a cross-section of a sixth embodiment of a synchronous motor with a superconducting rotor coil with two transformers.
Figure 8:
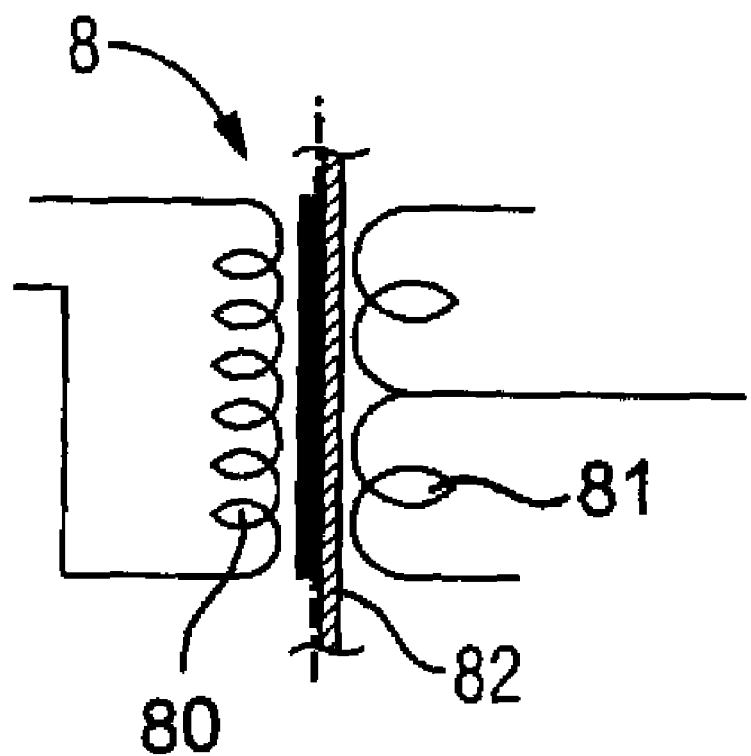
FIG. 8 is an enlarged detailed view of an area between primary and secondary windings of one of the transformers.

FIGS. 1, 2 and 3 show both windings of the second transformer at the superconducting temperature $T_s$. FIG. 8 shows the arrangement of a layer 82 of electrically insulating material between the primary winding 80 and the secondary winding 81 of the second transformer 8. Conversely, in FIG. 6, the boundary (indicated by the dash-dotted line) between the cooled region 9 (superconducting temperature $T_s$) and the region at ambient temperature (at temperature $T_u$) is located between the primary winding of the second transformer which is outside the cooled region, and the secondary winding of the second transformer which is inside the cooled region. In FIG. 7, the boundary between the regions at temperatures $T_s$ and $T_u$ is now located so that both windings 80, 81 of the transformer 8 are outside the cooled region, i.e., at temperature $T_u$.

FIG. 3 shows an electric motor 1 wherein the primary winding 5 of the transformer 4 is arranged in an annular recess of a common magnetic flux-conducting element (yoke) 65 that holds the primary winding 5 and the secondary winding 6.

In this case, like in the other embodiments described above, the flux-conducting yoke 65 of the transformer 4 can be constructed of laminated ferrite sheets (transformer sheets) to prevent eddy currents. Those skilled in the art will appreciate that at higher operating frequencies, in particular in the MHz range, energy can be transferred inductively from the stationery section to the rotating section through the opposing windings 5, 6 without the use of transformer sheets.

Figure 4:
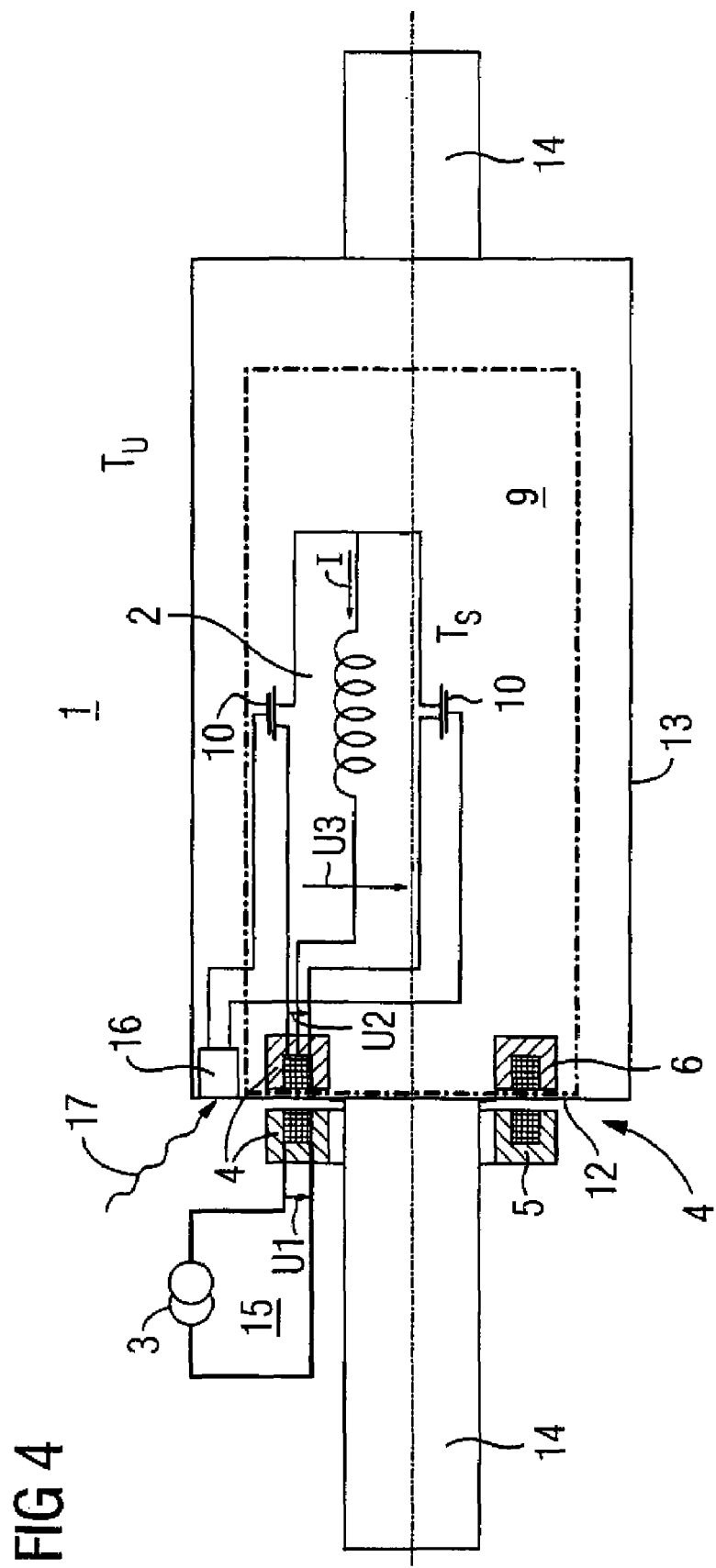
FIG. 4 shows a cross-section of a fourth embodiment of a synchronous motor with a superconducting rotor coil with one transformer.

FIG. 4 shows another embodiment of the electric motor 1 which has only a single transformer—namely the transformer 4—for supplying power to the rotor coil 2; the second transformer 8 used in the embodiments described above with reference to FIGS. 1, 2 and 3, has been eliminated.

The stationery primary winding 5 of the transformer 4 is here located in a "warm region", i.e., essentially at ambient temperature $T_u$. The rotating secondary winding 6 is arranged in the "cold region", i.e., at the superconducting temperature $T_s$.

A wall 12 made of a non-conducting material fills the gap between the two windings 5, 6. Suitable non-conducting materials are, in particular, glass fiber reinforced plastics. Although the gap between the windings 5, 6 may here be wider than in the embodiments described above with reference to FIGS. 1, 2, and 3, respectively, this does not adversely affect the performance when the transformer is operated at high frequencies. The wall 12 can here be, for example, a portion of the wall of the cryogenic vessel 13. The embodiment of FIG. 4 results in a particularly simple configuration.

Figure 5:
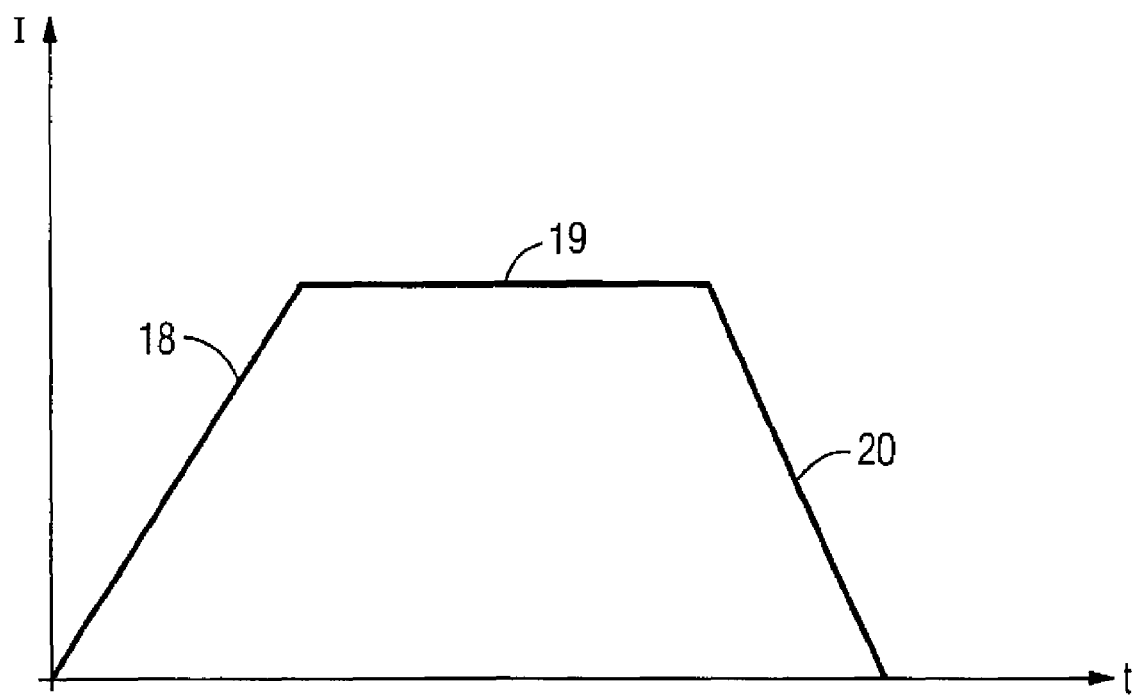
FIG. 5 shows schematically a diagram with the time dependence of the current in the rotor coil.
Figure 6:
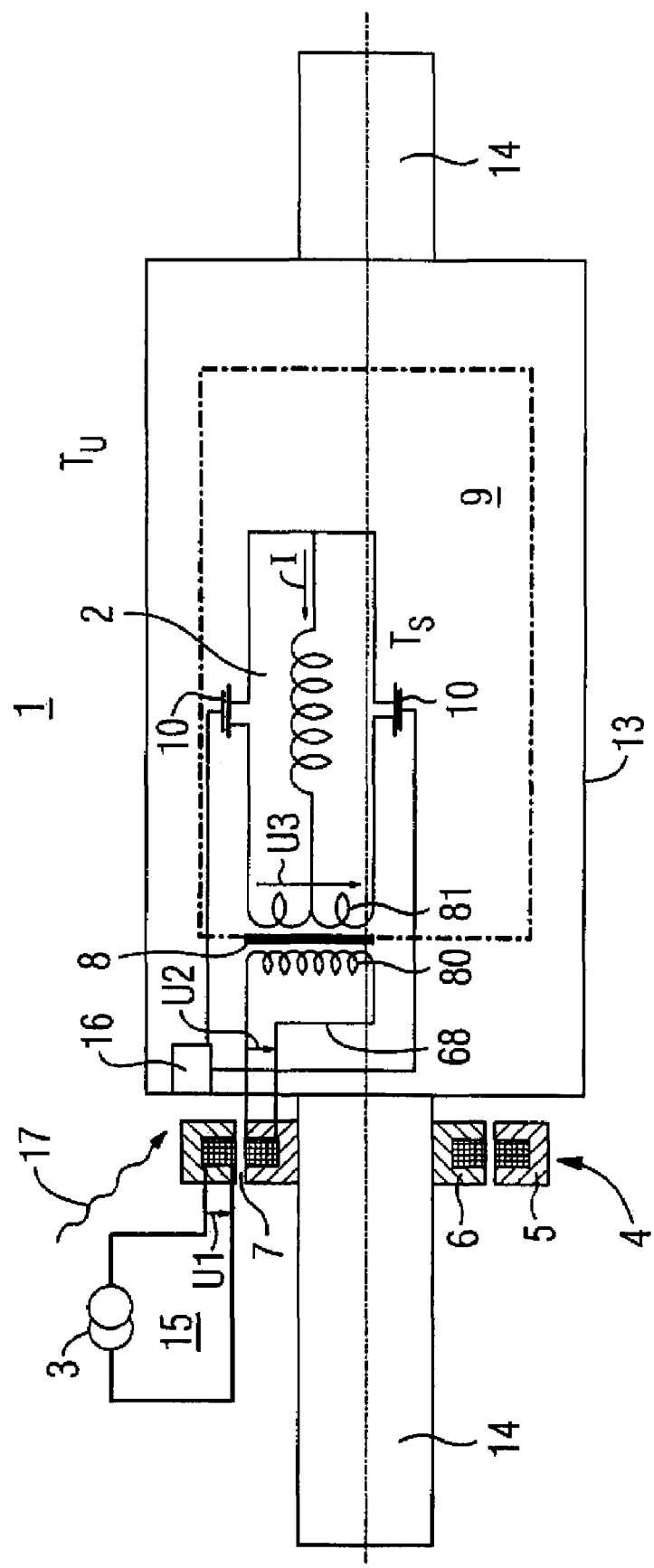
FIG. 6 shows a cross-section of a fifth embodiment of a synchronous motor with a superconducting rotor coil with two transformers.

FIG. 5 shows schematically a diagram of the current I flowing in the rotor coil 2 as a function of time t. Three operating regions are illustrated:

The magnetic field is rapidly built up in coil 2 by rapidly increasing the current in the coil 2 (charging phase 18, MOSFETs 10 in FIG. 1 in charging configuration). The gate supply of the rectifier bridge in the charging circuit is synchronized, with the power supply operating at a high voltage and/or high frequency to guarantee a high energy transfer rate.

During operation (holding phase 19, MOSFETs 10 in charging configuration), only the very small losses of the HTSC rotor coil have to be replenished. Small voltages and/or low frequencies are sufficient.

For discharging (discharge phase 20, MOSFETs 10 in discharge configuration), the phase of the MOSFET synchronization is shifted by 180°. Again, high voltages and/or high frequencies are selected for rapid discharge.

The use of MOSFETs is advantageous because high voltages and frequencies can be implemented, allowing a rapid adjustment to changing operating conditions. Protective diodes can be used to protect the windings should a faulty synchronization occur.

The coil is discharged according to the transformer-rectifier principle with cold MOSFET switches.

With the afore-described embodiments, energy can advantageously be transferred independent of the rotation speed, which is different from induction machines where the rotor voltage depends on the rotation speed.

The proposed device of the invention eliminates brushes which reduced wear on the motor parts during operation. The motor is also very compact and can therefore have a high power density. Moreover, the current supply line introduces only a small amount of heat into the cooled region, which helps maintain the superconducting properties of the coil and a high magnetic field in the rotor coil.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A device for supplying electric energy to at least one superconductor having a rotating region having a cooled region cooled to at least one predetermined temperature for achieving superconductivity, and a non-rotating region, said device comprising:
   at least one electric energy source in an uncooled region of the superconductor;
   a first transformer and a second transformer, each transformer having a primary winding and a secondary winding for transferring electric energy between the at least one energy source and the superconductor, wherein the primary winding of the first transformer is electrically connected with the energy source in the uncooled region, and the secondary winding of the second transformer is electrically connected with the superconductor in the rotating region;
   wherein the secondary winding of the first transformer is in the uncooled region and the primary winding of the second transformer is in the cooled region; and
   wherein the primary winding of the first transformer is located in the non-rotating region and the secondary winding of the first transformer is located in the rotating region.

2. The device of claim 1, wherein the primary winding and the secondary winding of the second transformer are spaced apart by an air gap.

3. The device of claim 1, wherein a layer of an electrically insulating material is arranged between the primary winding and the secondary winding of the second transformer.

4. The device of claim 1, wherein each of the first and second transformers transforms an AC voltage applied to the primary winding of the corresponding first or second transformer into an AC voltage in the secondary winding of the corresponding first or second transformer.

5. The device of claim 4, wherein a magnitude of the AC voltage in the secondary winding of at least one of the transformers is smaller than the AC voltage in the primary winding of the at least one transformer.

6. The device of claim 4, wherein a magnitude of the AC voltage in the secondary winding of at least one of the transformers is greater than the AC voltage in the primary winding of the at least one transformer.

7. The device of claim 1, wherein an AC voltage applied to the primary winding of the second transformer, which is connected with the secondary winding of the first transformer, is transformed into an AC voltage of the secondary winding of the second transformer that is provided to the superconductor.

8. The device of claim 7, wherein a magnitude of the AC voltage at the secondary winding of the second transformer is smaller than a magnitude of the AC voltage at the primary winding of the second transformer.

9. The device of claim 7, wherein a magnitude of the AC voltage at the secondary winding of the second transformer is greater than a magnitude of the AC voltage at the primary winding of the second transformer.

10. The device of claim 1, wherein at least one rectifier is electrically connected upstream of the superconductor.

11. The device of claim 10, wherein the rectifier is telemetrically controlled.

12. The device of claim 1, wherein at least one MOSFET switch is electrically connected upstream of the superconductor.

13. The device of claim 1, wherein the first transformer or the second transformer, or both, are operated at high frequencies.

14. The device of claim 1, wherein the primary winding and the secondary winding of at least one of the first and second transformers are arranged axially side-by-side.

15. The device of claim 1, wherein the primary winding and the secondary winding of at least one of the first and second transformers are radially stacked on top of one another.

16. The device of claim 1, wherein the primary winding and the secondary winding of at least one of the first and second transformers are arranged at, on, or in a common magnetic flux-conducting body.

17. The device of claim 1, wherein the primary winding and the secondary winding of the first transformer are arranged at, on, or in a first magnetic flux-conducting body, and the primary winding and the secondary winding of the second transformer are arranged at, on, or in a second magnetic flux-conducting body.

18. The device of claim 1, wherein the superconductor comprises a superconducting winding.

* * * * *